United States Patent [19]

Hell et al.

[11] Patent Number: 4,629,565
[45] Date of Patent: Dec. 16, 1986

[54] PROCESS FOR THE BIOLOGICAL TREATMENT OF SEWAGE

[75] Inventors: Walter Hell, Kaltenleutgeben; Bruno Hillinger, Hinterbruhl, both of Austria

[73] Assignee: Waagner-Biro AG, Austria

[21] Appl. No.: 697,586

[22] PCT Filed: May 7, 1984

[86] PCT No.: PCT/AT84/00015

§ 371 Date: Jan. 2, 1985

§ 102(e) Date: Jan. 2, 1985

[87] PCT Pub. No.: WO84/04295

PCT Pub. Date: Nov. 8, 1984

[30] Foreign Application Priority Data

May 5, 1983 [AT] Austria ................. 1651/83

[51] Int. Cl.$^4$ ................................. C02F 3/12
[52] U.S. Cl. .................... 210/607; 210/629; 210/207
[58] Field of Search ............ 210/625, 626, 195.1, 210/622-624, 629, 607, 620, 207

[56] References Cited

U.S. PATENT DOCUMENTS

| | | | |
|---|---|---|---|
| 2,889,047 | 6/1959 | Coate | 210/629 X |
| 3,152,982 | 10/1964 | Pagnotti | 210/629 X |
| 3,415,379 | 12/1968 | Thayer | 210/195.1 |
| 3,549,521 | 12/1970 | Stevens | 210/607 |
| 3,733,263 | 5/1973 | Mardt | 210/625 |
| 3,753,897 | 8/1973 | Lin et al. | 210/625 X |
| 3,799,346 | 3/1974 | Freese | 210/195.1 X |
| 3,959,124 | 5/1976 | Tchobanoglous | 210/625 X |
| 4,370,235 | 1/1983 | Suzuki et al. | 210/620 |

FOREIGN PATENT DOCUMENTS

| | | |
|---|---|---|
| 1548962 | 11/1969 | Fed. Rep. of Germany . |
| 2447501 | 4/1976 | Fed. Rep. of Germany . |
| 2654431 | 6/1978 | Fed. Rep. of Germany . |
| 2751470 | 8/1978 | Fed. Rep. of Germany . |
| 1324049 | 4/1962 | France . |
| 1497021 | 10/1967 | France . |

*Primary Examiner*—Tom Wyse
*Attorney, Agent, or Firm*—Steinberg & Raskin

[57] ABSTRACT

Method for purifying waste water in a compact settling plant, particularly for waste water which is biologically very loaded, wherein the final settling tank (23) is arranged inside a scavenging basin (3), wherein the aeration of waste is separated from the aeration of the return sludge, the two flows being mixed and previously degased before entering the scavenging basin and optionally once more contacted with a gas. Due to the star configuration of the aeration, suction and mixing units, a uniform charge and transformation are obtained so that at equal flow rate, the volume may be reduced with respect to conventional plants.

6 Claims, 4 Drawing Figures

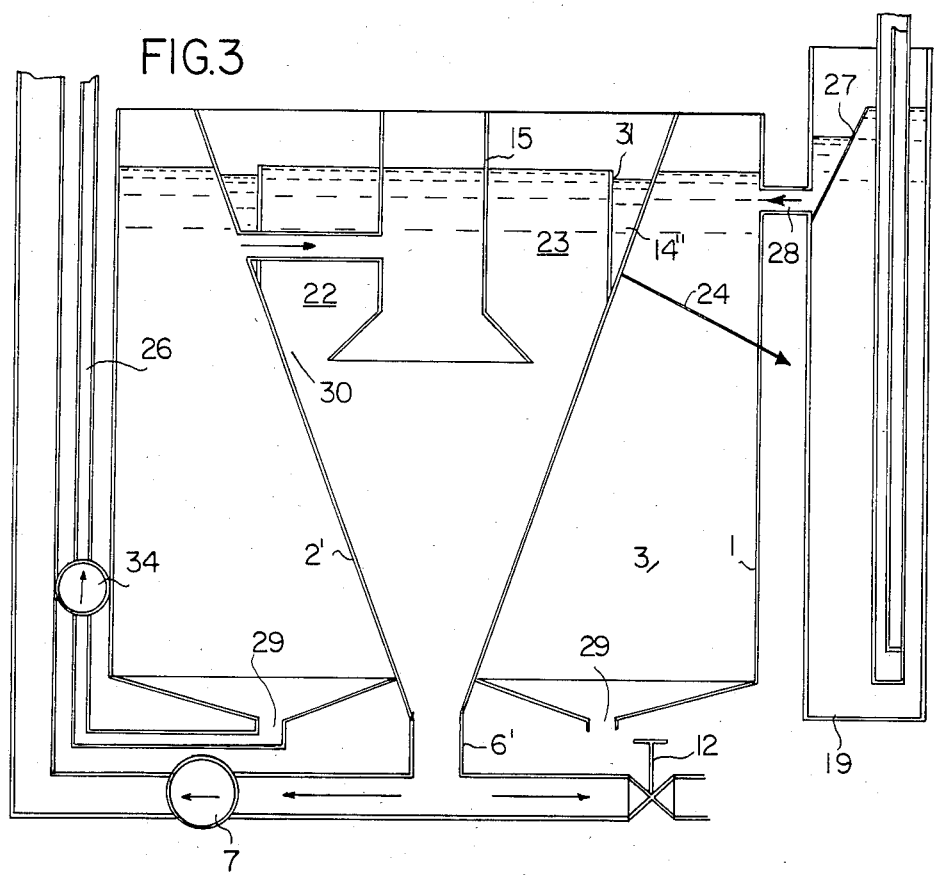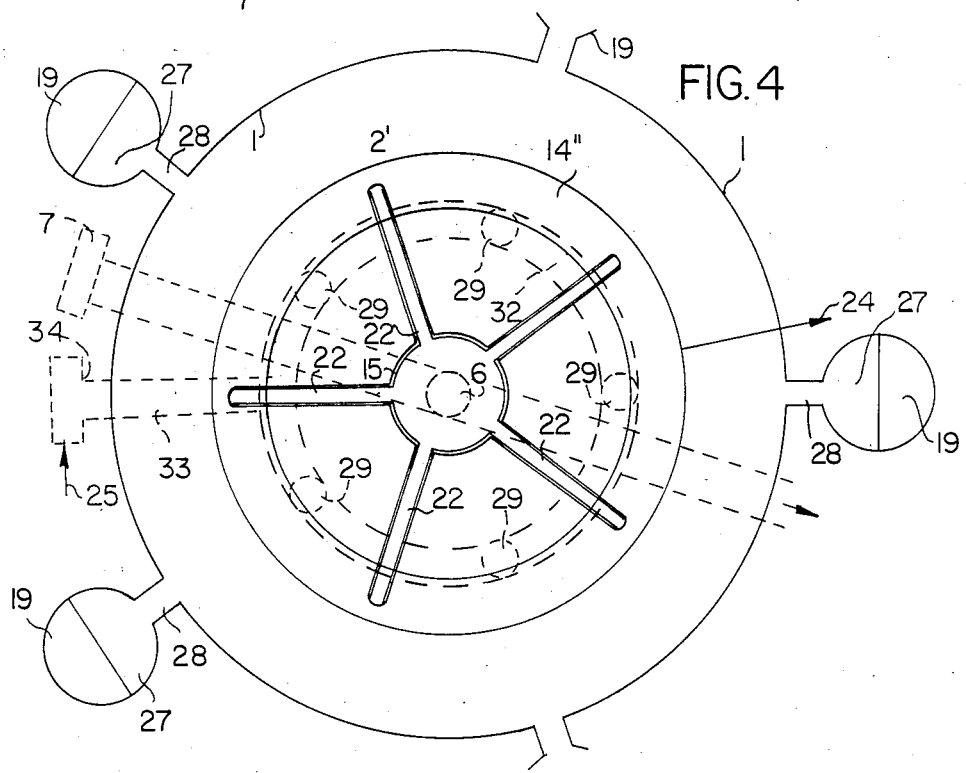

PROCESS FOR THE BIOLOGICAL TREATMENT OF SEWAGE

BACKGROUND OF THE INVENTION

The invention pertains to a process for the biological and, optionally, the chemical treatment of sewage using aeration in aeration basins arranged concentrically within a basin, secondary settling basins and sludge collection as well as an installation for carrying out the process.

The design of biological sewage treatment installations in a number of stages with an activation stage and at least one secondary settling stage is known. These installations have the disadvantage that they manifest a large floor space requirement. In the case of flocculation installations, compact sewage treatment plants such as FR-A 1,081,214 are known, in which the intermingling with the flocculator takes place in a central basin and the secondary settling in a surrounding ring basin. In addition, a two-stage treatment plant of tower design is known from CH-A 462,273, in which a treatment of the sewage is achieved though precipitation.

SUMMARY OF THE INVENTION

The invention has set for itself the task of creating a compact biological sewage treatment installation which is arranged in a container, whereby the container holds both activation and secondary settling basins and the aeration takes place above the activation basin through circulation of the contents of the basin and the secondary settling basin operates according to the system of up-current classification or according to fluidized bed filtration.

The process according to the invention is characterized by the fact that the sludge from the secondary settling basin is collected at a central point and, preferably by means of a pump, is conveyed to a separation device such as, e.g., a centribugal separator in which the sludge is separated into return sludge and excess sludge which is to be channeled off; that the return sludge is aerated before being directed to the ring-shaped aeration basin and that sewage is withdrawn from the activation basin, optionally mixed with fresh sewage and, finally, mixed with the aerated sludge from the secondary settling basin and that the mixture, after retention in the activation basin, is directed to the secondary settling basin. In the case of sewage with a particularly high biological or chemical oxygen requirement, the process is expanded in such a way that the activation basin is designed in two sections, whereby in the first section the intermixing and, particularly, the aeration of circulation liquid, rotation liquid and return sludge and, at the transition of the first into the second activation section, an additional aeration of the sewage takes place, and in the second section the degasifying is carried out and, finally, the degasified sewage is directed by way of a flow-off conduit to a central sedimentation channel into the secondary settling basin.

The installation according to the invention for carrying out the process is characterized by the fact that a conical or truncated cone-shaped inset in the form of a funnel is provided concentrically in a cylindrical basin, whose point or base surface is arranged at or above the bottom of the basin and whose outer casing leaves open a circular secondary settling basin, so as to provide in the inset a base sludge reamer and/or a central sludge chamber into which a suction pipe of a sludge pump extends, the pressure conduit of which is connected to a separation device such as, e.g., a centrifugal separator, manifesting an overflow and an underflow, whereby in the underflow a control valve is provided and the under- or overflow discharges into an aerator in the circular space between the inset and the basin.

BRIEF DESCRIPTION OF THE DRAWINGS

The invention is shown schematically and in examples in the attached FIGS. 1 to 4.

FIGS. 3 and 4 show, in similar representation, a constructive variant to the preceding.

DETAILED DESCRIPTION OF THE PREFERRED EMBODIMENTS

Figure 1:
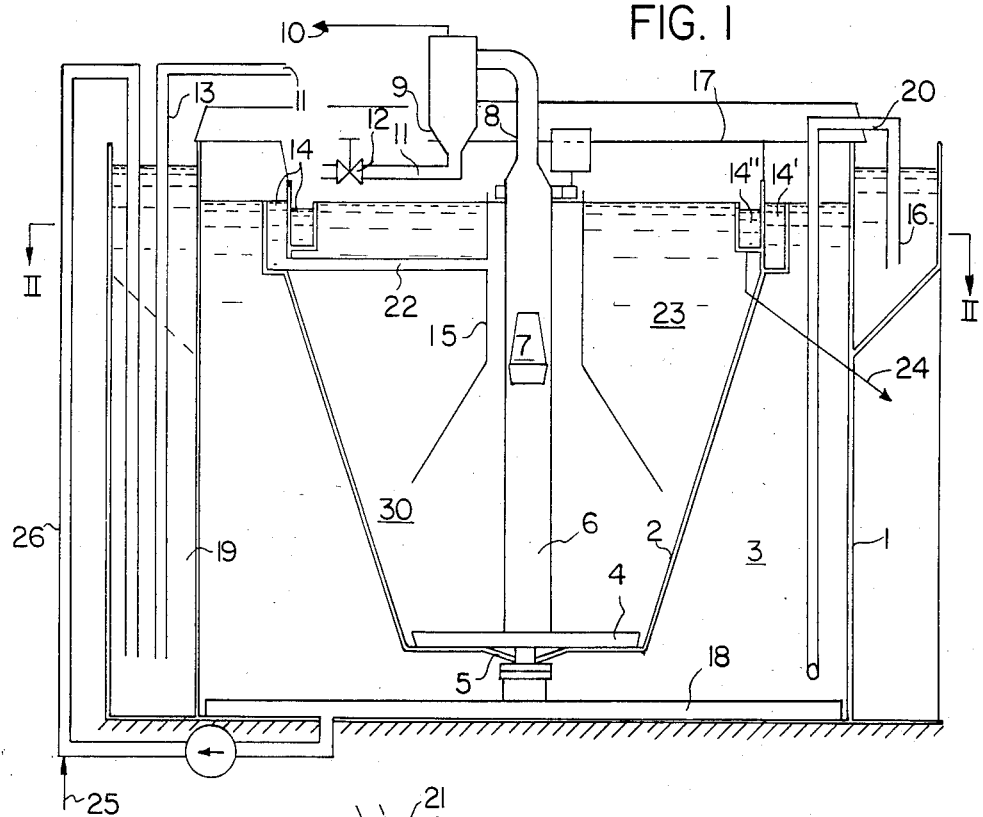
FIGS. 1 and 2 show in vertical plan and in section a sewage basin according to the invention.
Figure 2:
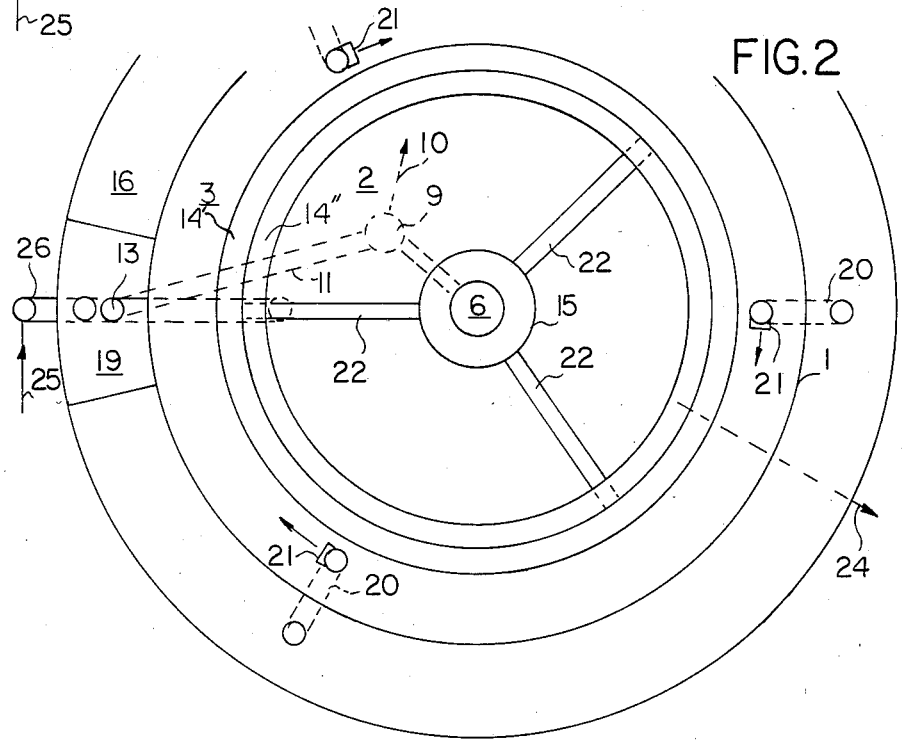

In FIG. 1 a cylindrical basin is shown inwhich a truncated conical inset 2 is arranged in the form of a funnel, whereby the greater base surface is provided in the area of the liquid level. The smaller base surface is arranged at or just above the bottom of the basin 1. The arrangement above the bottom facilitates the easy insertion of a base sludge reamer 18 at the bottom of the activation basin 3 which manifests a ring area whereby the driving gear for the base sludge reamer is directed through the secondary settling basin 23 which is limited by the truncated cone-shaped inset 2. The secondary settling basin 23 manifests a base sludge reamer 4 which conveys the precipitated sludge to a central sludge pit 5, from which it is evacuated by way of a central evacuation pipe 6 by a sludge pump 7 and raised above the liquid level of the secondary settling basin. In a separation device 9 which is arranged in the pressure conduit 8 behind the sludge pump 7, the sludge mass is divided into two partial currents which are developed as the overflow 10 and the underflow 11 of a centrifugal separator. The centrifugal separator is expediently designed as a cyclone whereby it has been found that the more vital bacteria colonies are located in the underflow 11 while in the overflow 10 the number of the inactive, dead bacteria is generally larger. A regulating valve 12 is located in the underflow 11, by means of which the quantity of the sludge flowing through the under- or overflow can be regulated. The sludge drained off through the overflow 10 is removed as overflow sludge. The sludge flowing through the underflow 11 is conveyed to an aerator 13 where it picks up atmospheric oxygen by flowing past aeration openings and becoming saturated or supersaturated with oxygen. This saturated sludge is introduced into a mixing vessel 19 where, together with the liquid from the circular activation basin 3 which has been aerated in a similar installation, it is intermixed with the latter. In the case of certain sewage, particularly chemical sewage, the more vigorous bacteria colonies are to be found in the overflow 10, so that in these cases the overflow is aerated and the underflow 11 is drained off as overflow sludge. Since the liquid and the sludge manifest different oxygen requirements as well as different reaction times, this installation allows an optimal gasification. The intermingled liquid is now channeled to a circular area 16 in which a partial degasification is set by enlargement of the free surface or a reaction time is set by the existing statistical settling time before the liquid is once again aerated by a siphon 20 and conveyed to the actual activation basin 3. The lower opening of the siphon 20 manifests a lateral arm 21 (FIG. 2) so that the liquid is subjected to a rotation in the circular area of the activation basin 3, as a result of which, on the one hand, the intermixing is enhanced, thus preventing the sedimentation of the sludge and, on the other hand, achieving a longer settling or reaction time. The surface water of the activation basin 3 is collected by means of a duct 14' and conveyed from this by conduit 22 to a central sink channel 15 in the secondary settling basin 23 where the actual separation of sludge and clear water takes place. The clear water is collected in the duct 14" and drained off by the clear water conduit 24. Preferably the conduits 14' and 14" are designed as a double conduit 14, whereby the middle separating wall extends above the liquid level. The infeed 25 of fresh sewage water takes place expediently by way of the standpipe 26 of circulating water for the activation basin or by way of a similar installation directly into the mixing vessel 19 which is designed as a common rising conduit for both the aerated sludge and the aerated sewage water. In FIG. 2, merely for the sake of example, the number of aeration installations or recycling conduits is arranged in threefold symmetry. In actual practice, the number of required parallel conduits is determined by ecomonic factors. Thus, for example, in FIGS. 3 and 4, a fivefold symmetry is selected for a somewhat simplified construction. In contrast to FIG. 1, FIG. 3 shows mixing vessels 19 arranged separate from the basin 1, the vessels having an overflow channel 27 from which the intermixed liquid flows over radially arranged chanels 28 or by way of siphons with a repeated aeration into the circular activation basin 3. The truncated conical inset from FIG. 1 is replaced by a conical funnel-shaped inset 2' which is designed with such a pitch that no sludge adheres to the walls of the inset and the precipitating sludge is directed over the point of the suction pipe 6' of the sludge pump 7, whereby the suction pipe 6' is, for practical purposes, designed as a central sludge pit. The activation basin 3 also manifests a conical base, whereby the openings 29 for the off-suction of liquid required for aeration are arranged in the zone of the cone tip. This measure eliminates the necessity for base sludge reamers, thus achieving a simplification of the apparatus's construction. In this case, of course, a rate control or cutoff device must be provided. Beyond this, it is not absolutely necessary to provide a channel 14' as shown in FIG. 1 and the conduit 22 can also be led directly from the activation basin 3 to the sink conduit 15 in which the actual separation of sludge and liquid enuses. The clear water then rises by way of the ring slot 30 to the upper portion of the secondary settling basin 23 and flows over the dividing wall 31 into the channel 14" from which the clear water drainoff 24 then enuses. The clear water drainoff can, as indicated in the figures, ensue by way of a conduit through the activation basin 3. If, however, an emptying of the activation basin 3 is provided, then the clear water drainoff ensues by way of a siphon connected to the reamer bridge which diverts the clear water from the channel 14" to a gutter-shaped clear water conduit (not shown).

As seen from the broken line representation in FIG. 4, the openings 29 for the sewage water of the activation basin 3 which is to be aerated are located above the circular area 32 which is connected by way of a conduit 33 with the circulation pump 34 operating the riser pipe or pipes to the aeration components. The invention is not limited to circular basins but can also be used analogously for rectangular basins.

We claim:

1. Method for the treatment of sewage to separate clear liquid from sewage sludge, said method comprising the steps of
   separating a flow of sludge from said sewage into a first flow constituting a sludge portion to be further treated, and a second flow constituting excess sludge,
   aerating said first flow,
   directing the thus-aerated first flow into an activator basin arranged concentrically in an outer basin, the activator basin having a conically-shaped basin concentrically arranged therein,
   separating liquid from said aerated first flow in the activator basin to form a more concentrated sludge in the activator basin,
   aerating the thus-separated liquid and mixing the same with additional first flow of sludge for further treatment,
   directing the more concentrated sludge from the activator basin to the conically-shaped basin concentrically arranged therein and subjecting the same to settling therein, thereby forming clear liquid and further concentrated sludge,
   separating the thus-formed clear liquid, and
   removing the thus-formed further concentrated sludge.

2. The method of claim 1 comprising the additional step of
   separating the removed, thus-formed further concentrated sludge into first and second flows thereof.

3. The method of claim 2 comprising the additional step of
   introducing fresh sewage, when necessary, into the thus-separated liquid from the activator basin.

4. The method of claim 3 comprising the additional steps of
   aerating the mixture of thus-separated liquid and additional first flow of sludge from the activator basin, and
   at least partially degasifying the thus-aerated mixture.

5. The method of claim 4, wherein
   the mixture of separated liquid and additional first flow of sludge is aerated in a first section of the activator basin, and
   at least partially degasified in a second section of the activator basin.

6. The method of claim 3, wherein
   the additional first flow of sludge is aerated in a separate conduit from the thus-separated liquid prior to mixing with the same, and
   the thus-separated liquid and additional first flow of sludge are mixed in a common uptake.

* * * * *